(12) United States Patent
Blandin et al.

(10) Patent No.: US 10,584,973 B2
(45) Date of Patent: Mar. 10, 2020

(54) PERSONALIZED INCENTIVES LEVERAGING INCIDENT-AWARE ROUTING

(71) Applicant: International Business Machines Corporation, Armonk, NY (US)

(72) Inventors: Sebastien Blandin, Singapore (SG); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/842,394

(22) Filed: Dec. 14, 2017

(65) Prior Publication Data

US 2019/0186928 A1 Jun. 20, 2019

(51) Int. Cl.
*G01C 21/34* (2006.01)
*G06Q 30/02* (2012.01)

(52) U.S. Cl.
CPC ..... *G01C 21/3415* (2013.01); *G01C 21/3484* (2013.01); *G01C 21/3492* (2013.01); *G06Q 30/02* (2013.01)

(58) Field of Classification Search
CPC ............ G01C 21/3415; G01C 21/3492; G01C 21/3484
See application file for complete search history.

(56) References Cited

U.S. PATENT DOCUMENTS

| 7,444,237 | B2 | 10/2008 | Dale |
| 8,401,786 | B2 | 3/2013 | Poppen et al. |
| 8,484,076 | B2 | 7/2013 | Roberts et al. |
| 9,105,185 | B2* | 8/2015 | Joglekar ............. G08G 1/0145 |
| 9,354,065 | B2* | 5/2016 | Ikavalko ................ G01C 21/00 |
| 9,709,417 | B1 | 7/2017 | Glasgow et al. |

(Continued)

FOREIGN PATENT DOCUMENTS

| EP | 1582842 A2 | 10/2005 |
| WO | 2013163333 A2 | 10/2013 |

OTHER PUBLICATIONS

Kim. S., et al., "Optimal Vehicle Routing with Real-Time Traffic Information", IEEE Transatctions on Intelligent Transporation Systems, 2005, Revised Sep. 14, 2004, 31 pages.

(Continued)

*Primary Examiner* — Tyler J Lee
(74) *Attorney, Agent, or Firm* — Scully, Scott, Murphy & Presser, P.C.; Daniel Morris, Esq.

(57) ABSTRACT

Disclosed are systems, methods, and computer program products that provide a user with alternative options to incident induced traffic by presenting the user with an alternate route to perform other tasks on a task list when travel is delayed by the incident. The method includes receiving a current location, a navigation route, an expected delay due to an incident, and a list of tasks from the user. Each task in the list may include a value and expected duration. The method further includes computing an incentive for each task in the list based on the received information and a probability that the user will re-route to stop at a facility for fulfilling the task, comparing the incentive and probability to determine which task has a minimal incentive and a greater probability that the user will re-route than not re-route to the facility, and presenting the minimal incentive to the user.

20 Claims, 5 Drawing Sheets

(56) References Cited

U.S. PATENT DOCUMENTS

| | | | | |
|---|---|---|---|---|
| 2008/0091341 A1* | 4/2008 | Panabaker | ............ | G01C 21/34 |
| | | | | 701/533 |
| 2008/0275646 A1* | 11/2008 | Perng | ................ | G01C 21/3476 |
| | | | | 701/414 |
| 2012/0226434 A1* | 9/2012 | Chiu | .................... | G08G 1/0112 |
| | | | | 701/117 |
| 2014/0229249 A1* | 8/2014 | Chiu | .................... | G08G 1/0112 |
| | | | | 705/14.1 |
| 2014/0229255 A1* | 8/2014 | Scofield | ............ | G06Q 30/0207 |
| | | | | 705/14.21 |
| 2015/0176997 A1 | 6/2015 | Pursche et al. | | |
| 2016/0069689 A1* | 3/2016 | Ikavalko | ................ | G01C 21/00 |
| | | | | 701/400 |
| 2016/0140589 A1 | 5/2016 | Deshpande et al. | | |

OTHER PUBLICATIONS

Samaranayake, S., et al., "A tractable class of algorithms for reliable routing in stochastic networks", Transportation Research Part C 20 (2012), Feb. 2012, pp. 199-217.

Samaranayake, S., et al., "Speedup Techniques for the Stochastic on-time Arrival Problem", 12th Workshop on Algorithmic Approaches for Transportation Modelling, Optimization, and Systems (ATMOS'12), Sep. 2012, pp. 83-95.

Dean, B.C., "Algorithms for Minimum-Cost Paths in Time-Dependent Networks with Waiting Policies", Networks, Aug. 2004, 7 pages, vol. 44, Issue 1.

Grewal, D., et al., "Innovations in Retail Pricing and Promotions", Journal of Retailing 87S, Accepted Apr. 25, 2011, pp. S43-S52, (1, 2011).

\* cited by examiner

FIG. 1

| TASK LIST | | |
| --- | --- | --- |
| TASKS | SHOPPING VALUE | EXPECTED SHOPPING DURATION (MIN) |
| TASK 1 | 50 | 20 |
| TASK 2 | 15 | 30 |
| TASK 3 | 60 | 55 |
| TASK 4 | 25 | 60 |
| TASK 5 | 30 | 15 |

PERSONALIZED INCENTIVES LEVERAGING INCIDENT-AWARE ROUTING

BACKGROUND

The present disclosure relates to systems and methods for retail or service operators to leverage the detection of a traffic incident or traffic conditions occurring on a user's travel route by providing personalized incentives to the user based on the traffic incident or traffic conditions that may induce the user to re-route to the retail or service operator's facility.

A variety of tools or applications are available for providing navigation information to a user when the user is driving an automobile. For example, a navigation application such as, e.g., Google Maps™, Waze®, Garmin®, in-automobile navigation systems, or other navigation applications may assist a user in planning a route from a starting point to a destination. The planned route often provides the user with an expected travel time based on either ideal or current conditions. Once the user is traveling along the route, however, real-time incidents may occur such as traffic volume, accidents, police or file department activity, VIP motorcades, road closures, construction, or other similar incidents that may delay the user's travel along the route. For example, a traffic-aware navigation application may attempt to re-route the user to an alternate route to avoid the traffic. This alternate route, however, may be a longer route or may involve other features which may cause the user additional aggravation such as stop signs, traffic lights, deteriorating roadways, etc., or may simply become flooded with other drivers attempting to also take the alternate route.

BRIEF SUMMARY

The system, method, and computer program product described herein provide retail and service operators with the capability to leverage the detection of a traffic incident or traffic conditions occurring on a user's travel route by providing personalized incentives to the user based on the traffic incident or traffic conditions that may induce the user to re-route to the retail or service operator's facility to perform tasks on the user's task list during the travel delay.

In some aspects of the present disclosure, a method for providing an incentive to a user to induce a re-route to a retail or service facility is disclosed. The method includes receiving a current location, a navigation route, and an expected delay due to an incident on the navigation route from a navigation application of a computing device and receiving, via an input device of the computing device, a list of one or more tasks from a user. Each task in the list may include an associated task value and expected task duration. The method further includes computing, by the computing device, an incentive for each task in the list based on the received expected delay, task value, expected task duration, and a probability the user will re-route to stop at a facility for fulfilling the task based on each incentive, comparing the incentive and probability calculated for each task to determine which task has a minimal incentive and a probability that the user will re-route to the facility that is greater than a probability that the user will not re-route to the facility, and presenting the minimal incentive to the user via a display of the computing device.

In some aspects, the method may further include receiving, via the input device, an acceptance of the minimal incentive from the use and in response to receiving acceptance of the minimal incentive from the user, transmitting a command to the navigation application to re-route the user to the facility.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

Situation-aware vehicle navigation applications may leverage real-time information about traffic incidents to provide users with additional information or options. For example, real-time traffic or incident information may be leveraged to implement incident-aware incentives and re-routing that may meet with the goals of a user's task list while allowing retail and service establishments to draw in users that would otherwise pass them by.

The method, system, and computer program products described herein allow retail outlets (or services), such as, e.g., shopping centers, to issue targeted incentives to attract new users that leverage predicted traffic or other traffic incident delays and user information such as, e.g., a task list, to determine when the traffic or other incident delays may be offset by incentives and the opportunity to meet the goals of the user's task list. This empowers retailers to leverage pervasive sensing for smarter commerce and provides users with the ability to efficiently manage their time relative to delays caused by traffic incidents.

Figure 1:
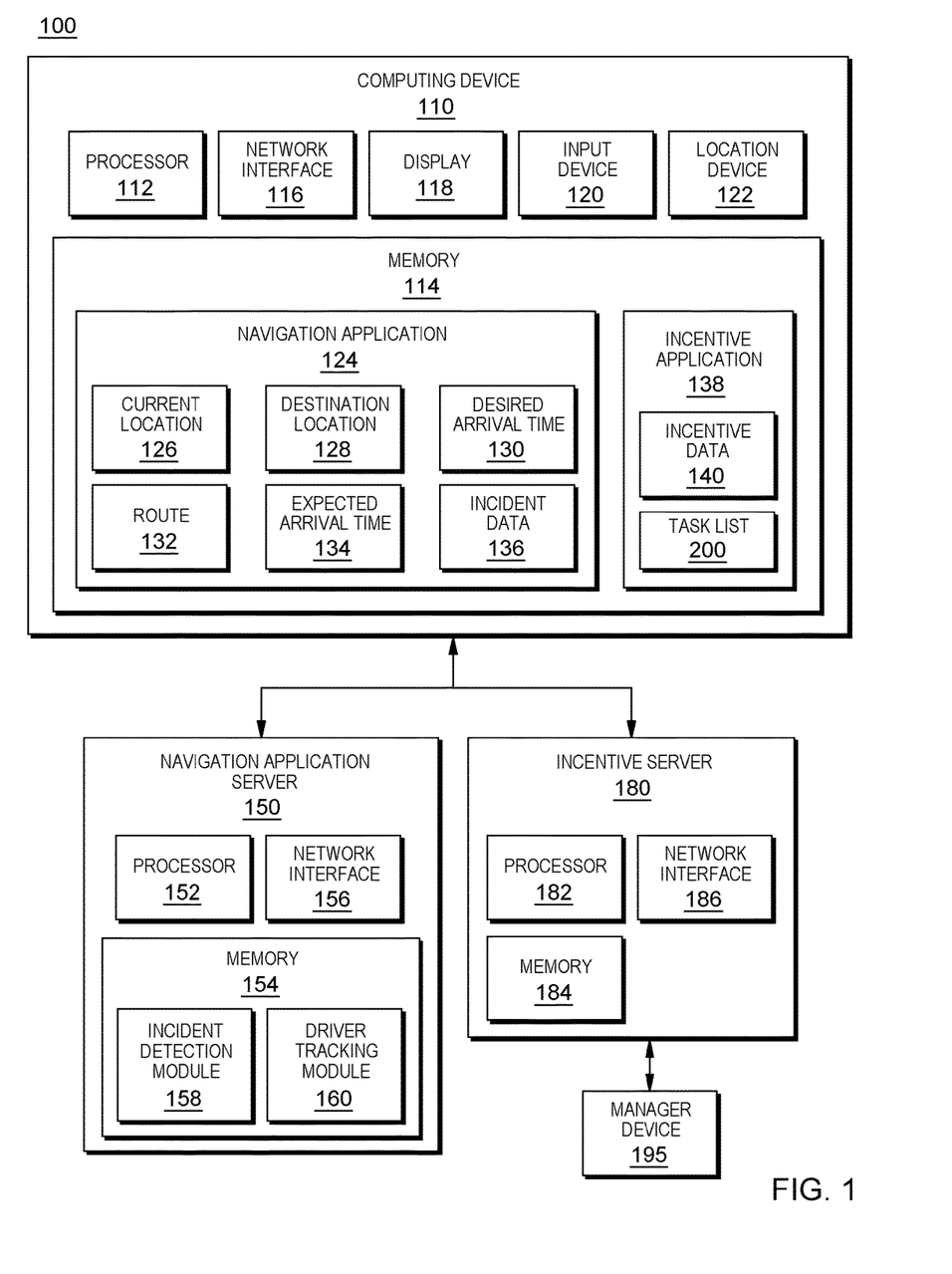
FIG. 1 is a system diagram illustrating a system in accordance with some aspects of the present disclosure.

With reference now to FIG. 1, a system 100 for leveraging incident-awareness to generate incentives is illustrated. In some aspects, system 100 includes a computing device 110, a navigation application server 150, an incentive server 180, and a manager device 195.

Computing device 110 includes at least one processor 112, memory 114, at least one network interface 116, a display 118, an input device 120, location device 122, and may include any other features commonly found in a computing device. In some aspects, computing device 110 may, for example, be a computing device associated with a user that is configured to present a navigation application 124, and incentive application 138, or both to the user via display 118. In some aspects, computing device 110 may include, for example, a personal computer, laptop, tablet, smart device, smart phone, smart watch, in-automobile navigation device, or any other similar computing device that may be used by a user for navigation and route planning.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a navigation application server 150, incentive server 180, or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from navigation application server 150 and incentive server 180.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, for example, display 118 may be integrated into an automobile, for example, as an on-board multi-use display that may be utilized to present navigation and non-navigation functions to a user of the automobile. In some aspects, for example, display 118 may be a projector or other device that is configured to present information as a heads-up display, e.g., via a reflection on a windshield of the automobile. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Location device 122 may include, for example, any location sensing device that is configured to determine a location of computing device 110. For example, location device may be a global positioning system (GPS) receiver that is configured to receive a GPS signal from one or more GPS satellites. In some aspects, location device 122 may be a device that is configured to receive cellular signals from one or more towers of a cellular network and triangulate a location of computing device 110 based on the received signals. Any other device that may be used to determine a location of computing device 110 may also be used.

Navigation application Server 150 includes a processor 152, memory 154, and a network interface 156 that may include similar functionality as processor 112, memory 114, and network interface 116. In some aspects, navigation application server 150 may, for example, be any computing device, server, or similar system that is configured to interact with or provide data to computing device 110 for use by a navigation application 124 resident in memory 114 of computing device 110.

Incentive Server 180 includes a processor 182, memory 184, and a network interface 186 that may include similar functionality as processor 112, memory 114, and network interface 116. In some aspects, incentive server 180 may, for example, be any computing device, server, or similar system that is configured to interact with or provide data to computing device 110 for use by a navigation application 124, a incentive application 138, or both resident in memory 114 of computing device.

Manager device 195 may include any computing device associated with a retail or service facility including, for example, a mall operator, individual retail chains or stores, or any other entity that may make a decision on or approve a potential incentive for presentation to the user of computing device 110.

In some aspects, memory 114 may store a navigation application 124. Navigation application 124 may be configured to determine a current location 126 of the computing device 110, e.g., using location device 122, and may be configured to receive a destination location 128 and desired arrival time 130 from a user of computing device, e.g., via input device 120. Each of the current location 126, destination location 128, and desired arrival time 130 may also be stored in memory 114. Navigation application 124 may be further configured to determine one or more routes 132 from the current location 126 to the destination location 128 along with an expected arrival time 134 for each route. The routes 132 and expected arrival time 134 may be presented to the user, e.g., via display 118 for selection of a desired route. Each of routes 132 and expected arrival time 134 may also be stored in memory. In some aspects, for example, any common navigation application may be used including, for example, Google Maps™, Waze®, Garmin®, Android Auto®, Apple CarPlay®, or any other navigation application. In some aspects, determining routes may be performed by navigation application 124 on computing device 110. In some aspects, navigation application 124 may transmit some or all of current location 126, destination location 128, desired arrival time 130, route 132, and expected arrival time 134 to navigation application server 150 for further processing. In some aspects, for example, navigation application server 150 may generate the one or more routes 132 and expected arrival times 134 and may transmit the one or more routes 132 and expected arrival time to navigation application 124 for presentation to the user, e.g., via display 118.

Navigation application 124 may receive periodic or real-time updates regarding road, route, or traffic conditions from navigation application server 150, e.g., via network interface 116, as incident data 136. In some aspects, for example, navigation application server 150 may include an incident detection module 158 that determines when and where an incident has occurred. For example, incident detection module 158 may track the location of all active users of navigation application 124 using a driver tracking module 160. Driver tracking module 160 may receive the current location 126 and movement related information of each user, e.g., from location device 122 of each computing device 110 via navigation application 124, and may determine whether an incident has occurred based on a lack of movement or reduced movement of a threshold number of users in a particular location or region. In some aspects, navigation application 124 may monitor police reports or other emergency information to determine where an accident or other emergency has occurred. Incident detection module 158 may alternatively determine whether an incident has occurred in any other manner commonly used by navigation applications. This determination of whether and where an incident has occurred and any impact on travel times may be provided to navigation application 124 as incident data 136.

While current navigation applications may either extend the expected arrival time 134 or attempt to re-route the user to an alternate route in an attempt to avoid traffic based on received incident data 136 that indicates traffic conditions or an incident, waiting in traffic or re-routing to avoid traffic may be inefficient in the long run where an alternative possibility for productive use of the user's time is available, e.g., by completing tasks on the user's task list or obtaining goods or services using an incentive.

Incentive application 138 is configured to generate an alternative option to the traffic caused by the incident by determining the best (e.g. least costly yet effective) set of incentives to present via computing device 110 to the user that may entice the user to accept and divert his or her journey to a retail or service facility. In some aspects, the determination may be performed on computing device 110 as part of incentive application 138. In some aspects, the determination may be performed by incentive server 180 and may be transmitted to computing device for use by incentive application 138 as incentive data 140. Incentive application 138 may present the incentive to the user, e.g., via display 118, and, if the incentive is accepted, cause navigation application 124 to re-route the user to the location of the retail or service facility.

In some aspects, the system determines the set of incentives likely to entice drivers to divert to the retail or service facility as a function of the predicted delays on their route and the impact that the diversion would have given those delays on the desired arrival time 130 of the driver to his or her final destination location 128. For example, incentive application may receive data from navigation application including some or all of current location 126, destination location 128 desired arrival time 130, route 132, expected arrival time 134, and incident data 136. This data may be analyzed either by incentive application 138 or incentive server 180 to determine local retail or service facilities and any incentives that may be provided to the user to entice the user to travel to those local retail facilities. In some aspects, these incentives may be provided to a manager device 195 of the local retail or service facilities for approval.

Often shopping or the use of other services may be an activity with low priority for the user. In the absence of both an incentive and incidents on the route, the user is faced with the choice of:

$$a) \text{travel\_time} \quad (1)$$

$$b) \text{travel\_time} + \text{task\_duration} - \text{task\_value} \quad (2)$$

Where option a) corresponds to not stopping for the task, and option b) corresponds to stopping for the task.

When an incident occurs, the travel-time increases and the cost of option a) increases by the delay:

$$a) \text{travel\_time} + \text{delay} \quad (3)$$

The cost of option b), however, may increase or remain the same. This is because part of the congestion is cleared during the tasks and the cost of option b) may be adjusted as:

$$b) \text{travel\_time} + \max(\text{task\_duration}, \text{delay}) - \text{task\_value} \quad (4)$$

As seen from equation (4), if delay is less than or equal to the task duration, the cost of option b) may remain the same.

For example, if the user performs a shopping task during the congestion, the user does not experience the entire cost of congestion. In addition, if the delay is smaller than the task duration, the user does not experience the congestion at all due to the shopping task. The change due to the incident is that the incident makes option b) relatively more attractive, e.g., productive use of time, compared to option a), e.g., time wasted sitting in traffic.

From the perspective of a retail or service facility such as, e.g., a shopping mall, the minimal incentive needed to entice a user into option b) is the minimal amount required to make option b) more attractive, given the incident. For example, the incentive amount may be equal to:

$$\max((\text{cost of option } b - \text{cost of option } a), 0) \quad (5)$$

Which may also be shown as:

$$\max([\text{travel\_time} + \max(\text{task\_duration}, \text{delay}) - \text{task\_value}] - [\text{travel\_time} + \text{delay}], 0) \quad (6)$$

Which sums to:

$$\max(\max(\text{task\_duration}, \text{delay}) - \text{task\_value\_delay}, 0) \quad (7)$$

This is a decreasing function of the delay, which means that the incentive cost (incurrent to the retail or service facility) reduces when the congestion (and the delay) increase. Because of this, incentive server 180 or incentive application 138 may evaluate all of the parameters from navigation application 124 including, for example, current location 126, destination location 128, desired arrival time 130, route 132, expected arrival time 134, incident data 136 (including likely delay) for each user when deciding the incentive to provide to each user.

Figure 2:
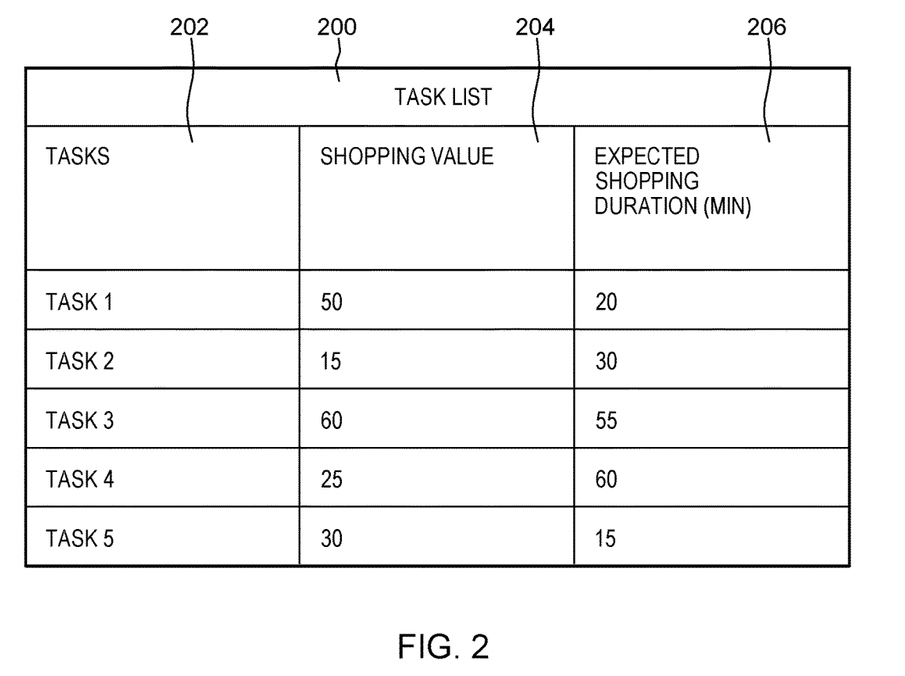
FIG. 2 is an illustration of a task list in accordance with some aspects of the present disclosure.

In some aspects, incentive server 180 may take into account the tasks that the user may wish to accomplish on his journey or in general. For example, incentive application 138 may request that the user create a task list 200, e.g., as illustrated in FIG. 2, for example, via input device 120. With reference now to FIG. 2, task list 200 may include a list of tasks 202 as commonly found on a generic task or to-do list. Unlike the typical task list, however, task list 200 further includes a value 204 for each task 202 as well as an expected duration 206 for each task 202. The value 204 and expected duration 206 may, for example, be input by the user via input device 120. The value 204 may be based on any method or metric that rates a priority or importance of individual tasks 202. For example, each value 204 may be in the range from 0 to 60, e.g., task 1 has a value of 50, task 2 has a value of 15, etc. The range of 0 to 60 may allow for easy calculation of the value vs. expected duration in minutes. For example, the value 204 may represent the user's determination of how much time the task is worth to them. Any other range or metric for valuing the tasks 202 may also or alternatively be used. The expected duration may be in any unit of time including, for example, seconds, minutes, hours, etc. As illustrated in FIG. 2, for example, the expected duration 206 for each task is in minutes.

By including value 204 and expected duration 206 in the task list 200 for each task 202, the task list 202 may be utilized for future analytic applications. For example, the user preferences may be modeled as a function of time spent. In the absence of any task 202, the user would travel through the route 132 with minimal travel-time. When considering the tasks 202 to be completed, each task 202 has a cost, which is the duration of the task, since completing the task effectively increases the travel-time by the duration of the task 202. The task also has a value 204, which characterizes the fact that completing a task 202 is beneficial, despite the increased travel-time duration. The value 204 may be considered the task's priority, which may be input by the user, for example, responsive to an inquiry presented by computing device 110 of "how much time is the task worth to me"? Accomplishing a particular task 202 may have an overall cost determined based on the following equation:

$$\text{Overall cost}=\text{task\_duration}-\text{task\_value} \qquad (8)$$

A very important task with high value and moderate duration may have a negative cost and may be desired by the user to be done as soon as possible by taking advantage of the time caused by the delay to complete the task. Other tasks with lower priority or higher duration may not be enough of an incentive for the user to re-route. For example, as illustrated in FIG. 2, task 1 has a value of 50 and an expected duration of 20. The overall cost of task 1 would be 20−50=−30, a negative cost. In contrast, task 4 has a value of 25 and an expected duration of 60 for an overall cost of 60−25=35, a less desirable option.

If an expected delay is 30 minutes, for example, the incentive for task 1 may be calculated according to equation (7) as max(max(20, 30)−50−30, 0)=max(30−50−30.0)=max(−50.0)=0. Thus for task 1, the incentive necessary to entice a user to re-route to perform task 1 at the retail or service facility is 0.

In contrast, the incentive for task 4 may be calculated according to equation (7) as max(max(60, 30)−25−30, 0)=max(60−25−30.0)=max(60−55, 0)=5. Thus for task 4, the incentive necessary to entice a user to re-route to perform the task for the same delay is 5. Task 4 may be compared to task 1 to determine which task requires the least amount of incentive, in this case task 1.

While described above with reference to numbers such as 0 and 5, the incentive may be any form of number whether monetary, e.g., $5 dollars off or a $5 dollar coupon, a percentage, e.g., 5% off, or any other form. For example, the calculated incentive may be used in a look-up table to determine the incentive value to provide to the user, may be multiplied or used in a calculation to determine the incentive value to provide to the customer, or may be used in any other manner.

In some aspects, the optimal incentive may be determined using a gradient descent method over the return of the retail or service facility taken as a function of the incentive level. For example, the function may be concave since marginal returns are decreasing as a function of the incentive level. After evaluating the parameters for all users and all tasks, the manager device 195 may decide what is the best optimal policy given the benefits of additional customers (in sales) minus the cost of the incentives. Since sales increase with an increase in incentives, but the costs associated with those incentives also increase, the optimal value may be identified via a gradient descent. In addition, the location of the retail or service facility relative to the user's route may be utilized as an additional transaction cost that can be integrated. For instance, the number of items sold may be a function $N(P,I)$ of the price and the incentive, and the overall return of the retail facility may be the total amount of items sold times the price, i.e. $N(P,I) \cdot P$, minus the total cost, i.e. $N(P,I) \cdot (C(P)+I)$ where $C(P)$ is the cost of the item at price P, and I, is the incentive level. Assuming that N is an increasing concave function of I, it follows that the overall return is also concave.

In some aspects, the probability of the user stopping at the retail or service facility as a function of the incentive size may be computed to take into account the uncertainties of travel time, user choice or other similar non-deterministic considerations, for example, using an online adaptive shortest path method on the road network graph with stochastic weights corresponding to link travel-times. In some aspects, for example, correlations between uncertain quantities such as travel-time, may be included in the model. In some aspects, a stochastic shortest path algorithm may be used to determine the probability. Given a road network with random weights corresponding to random travel-times, the probability of a user to travel along a certain route may be computed. Edges may have random weights, while tasks may include random rewards. The random aspect models the uncertainty in the user evaluation of costs and rewards.

In some aspects, the expected arrival time 134 may be received by incentive application 138 from the navigation application 124. The expected arrival time 134 may be determined based on the current location 126, destination location 128, and incident data 136 received from a navigation application server 150 by the navigation application 124. In some aspects, the expected arrival time 134 may indicate a time at which the user is predicted to arrive at the destination location should the user continue along the route 132 instead of re-routing to the facility based on the minimal incentive.

In some aspects, incentive application may determine a second expected arrival time that indicates a time at which the user is predicted to arrive at the destination location should the user re-route to the facility in response to receiving the minimal incentive. The second expected arrival time may be determined based on the expected task duration, route 132, and the incident data 136. In some aspects, the second expected arrival time may be presented to the user along with the minimal incentive to show the user when the user is expected to arrive at their destination location 128 if they re-route to the facility to perform the task.

In some aspects, the expected arrival time 134 and second expected arrival time may be compared to determine a difference between the two options, e.g., option a) and option b) described above. In some aspects, difference between the two expected arrival times may also be presented to the user to allow the user to make an informed decision.

Figure 3A:
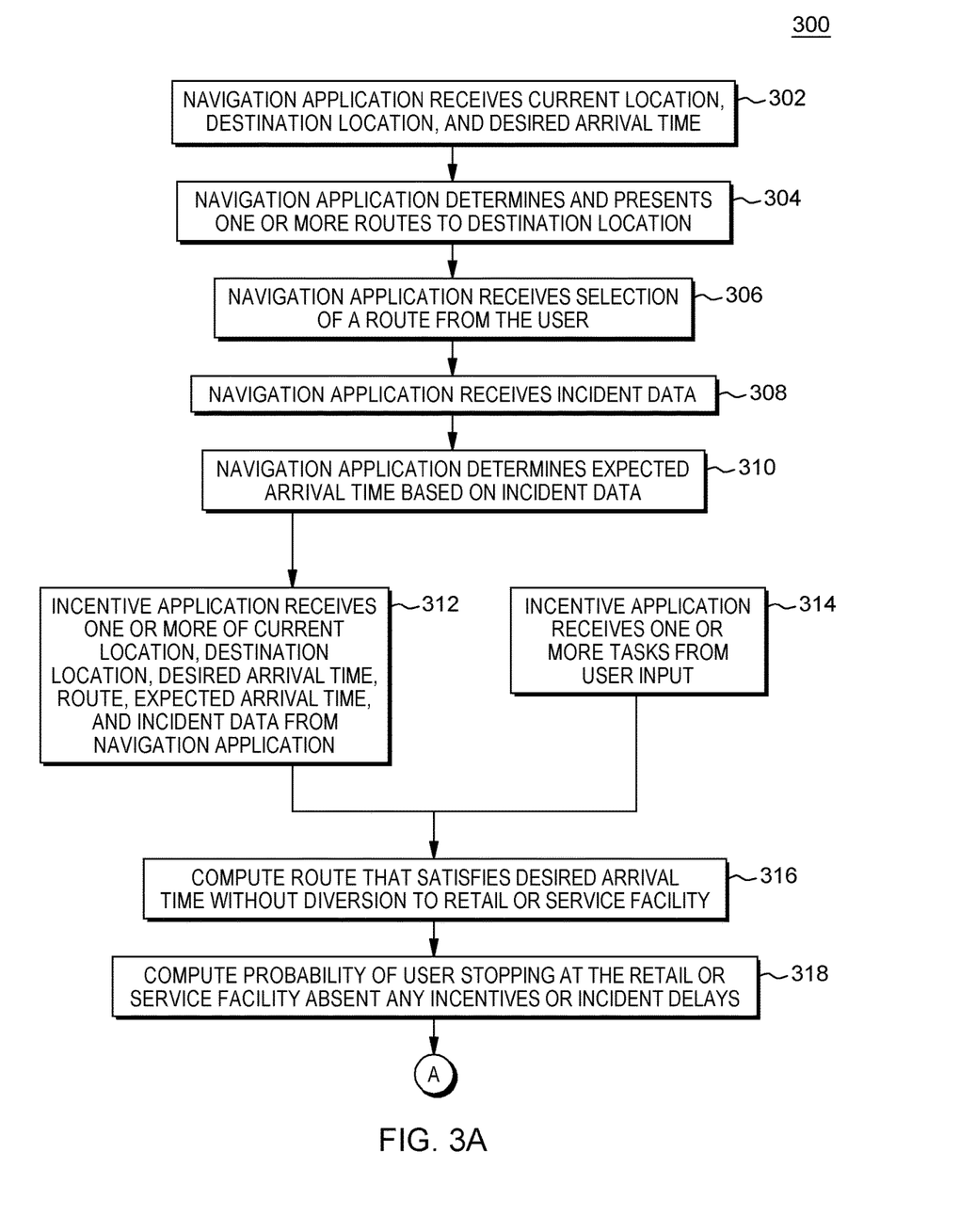
FIGS. 3A and 3B illustrate a flow chart of a method in accordance with some aspects of the present disclosure.
Figure 3B:
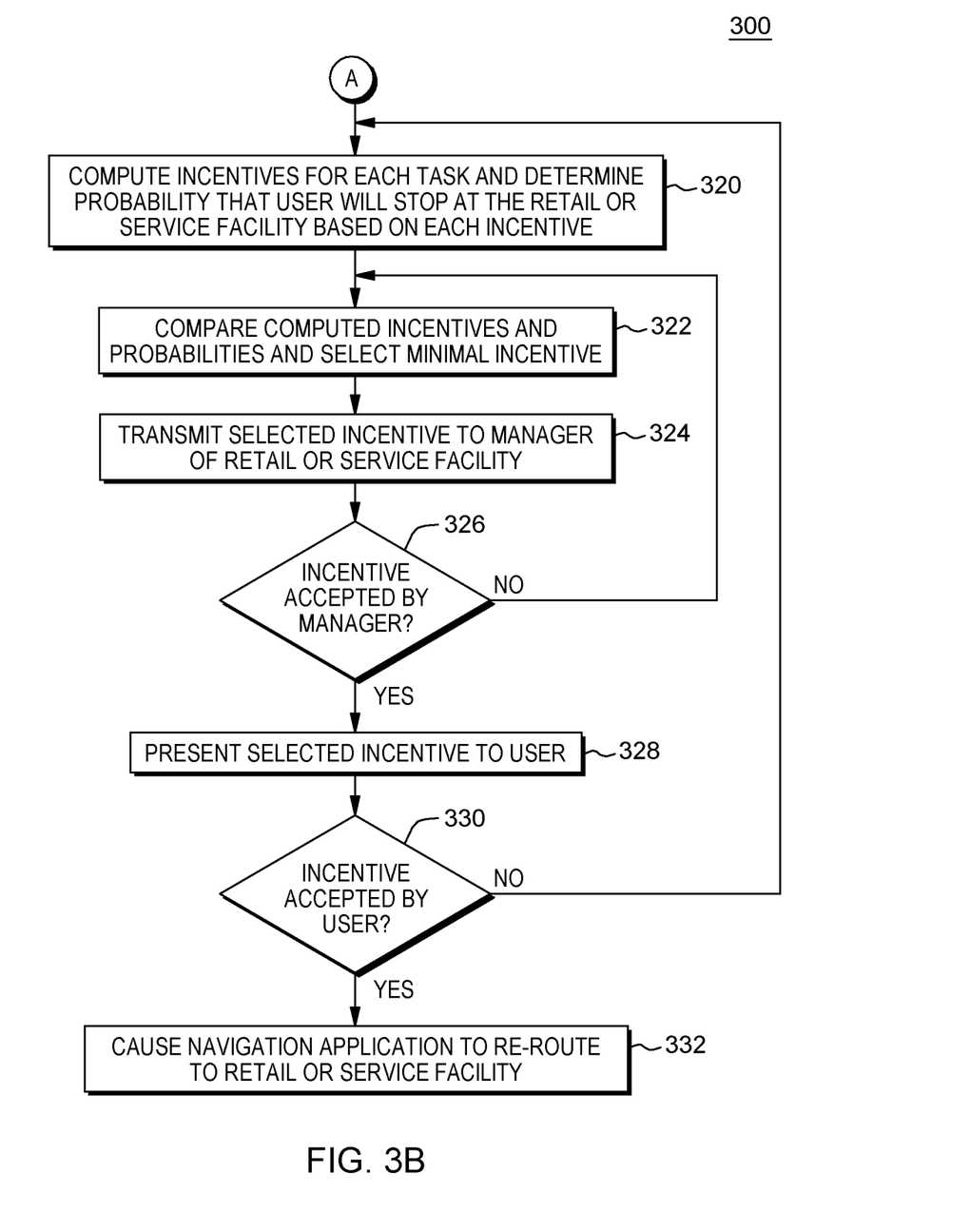

With reference now to FIGS. 3A and 3B, a method 300 for determining personalized incentives for retail or service facilities to induce users to alter a travel route based on incident-aware navigation data is illustrated.

At 302, navigation application 124 receives the current location 126 of the computing device 110, e.g., from location device 122, and receives a destination location 128 and desired arrival time 130 from the user, e.g., via input device 120.

At 304, navigation application 124 determines one or more routes 132 from the current location 126 to the destination location 128 and presents the one or more routes 132 to the user, e.g., via display 118.

At 306, navigation application 124 receives a selection of one of the one or more routes 132 by the user, e.g., via input device 120.

At 308, navigation application 124 receives incident data 136 from navigation application server for the selected route 132. For example, navigation application server 150 may generate the incident data 136 using an incident detection module 158 as described above or in any manner commonly known in the field. In some aspects, the incident data 136 may be received prior to the user selection of the one of the one or more routes 132 and may be presented to the user with each route 132 prior to the user selection.

At 310, navigation application 124 or navigation application server 150 determines an expected arrival time 134 for the route based on the incident data 136. In some aspects, the expected arrival time 134 may include delay information, for example, an estimated or predicted amount of delay that has been added to the route 132 based on the incident data 136. For example, the delay may be determined by a comparison of the predicted amount of delay to an ideal travel time from the current location 126 to the destination location 128.

At 312, one or more of current location 126, destination location 128, desired arrival time 130, route 132, expected arrival time 134 and incident data 136 may be received from the navigation application 124 by the incentive application 138, and in some aspects, may be transmitted to incentive server 180.

At 314, one or more tasks may be received from the user by incentive application 138, for example, via input device 120. For example, incentive application 138 may present the user with a task list 200, e.g., via display 118, and the user may input, modify, or add tasks as desired, e.g., using input device 120. In some aspects, for example, the user may input a task name 202, value 204, and expected duration 200 into the task list 200 for each task. In some aspects, one or more of the tasks may be received from the user by incentive application 138 prior to the user activating navigation application 124 for the traveling from the current location 126 to the destination location 128. In some aspects, for example, one or more of the tasks may be received while the user is traveling along route 132 to the destination location 128. For example, in some aspects, step 314 may occur in parallel with steps 302-312 or independent of steps 302-312.

At 316, incentive application may determine a route 132 that satisfies the desired arrival time 130 without diversion to the retail or service facility and may determine the probability of an on-time arrival by the user. In some aspects, navigation application 124 may perform step 316 instead of incentive application 138. In some aspects, for example, the probability of on-time arrival may be used to take into account parameters and quantities that are not perfectly known. For example, the probability may be used to consider the case where the user is not looking for the minimal cost option, but rather the option that maximizes the probability that his cost is below a certain threshold value.

At 318, incentive application 138 or incentive server 180 may determine a probability of the user stopping at a retail or service facility located near or along the route 132, absent any incentives or incident related delays, for example, as described above. The probability of the user stopping may also be used to take into account parameters and quantities that are not perfectly know as described above.

At 320, incentive application 138 may compute incentives to be provided to the user for each task, e.g., using task list 200 and equation 7 as described above, and may determine the probability that the user will stop at the retail or service facility based on each incentive.

At 322, incentive application 138 may compare the computed incentives and probabilities and may select the minimal incentive that provides a probability of the user stopping at the retail or service facility that is higher than the probability of the user not stopping at the facility and instead continuing on the route even with the incident. For example, in a deterministic setting, it may be sufficient for an incentive application to make sure that the cost of option b is below the cost of option a. In a non-deterministic setting, even if the cost of option a is higher than the cost of option b, there is still a non-zero probability that option a is selected by the user. By utilizing the probabilities, all the actions of "causing xxx by doing yyy" taken in a deterministic setting may now be translated into "causing the probability of xxx to happen to be at least zzz by doing yyy" which allows the incentive application to take into account a more sophisticated real-life environment.

At 324, incentive application 138 or incentive server 180 may transmit the selected minimal incentive or any or all of the computed incentives to manager device 195, for approval by the target retail or service facility that will fulfill the incentive and corresponding task.

At 326, incentive application 138 or incentive server 180 may receive a response from manager device 195. If the response includes an approval of the selected minimal incentive or other incentives, the method proceeds to 328. If the response does not include an approval, the method returns to steps 320 and 322 and computes new incentives, selects another incentive as the minimal incentive, or selects an incentive for another task as the minimal incentive. For example, in some aspects, the rejected incentive and corresponding task may be ignored for the new computations in an attempt to find a retail or service facility that will accept an incentive.

In some aspects, steps 324 and 326 may not be executed and the method may flow from step 322 direct to step 328. For example, incentive application 136 may be an application of a large retail chain where no separate approval by a manager of a store, mall, or other facility may be necessary to enable the incentive application 136 to provide the minimal incentive to the user.

At 328, incentive application 138 may present the selected incentive and corresponding task 202 to the user, e.g., via display 118. In some aspects, incentive application 138 may present the calculated incentives for each of the tasks 202. In some aspects, incentive application 138 may present each of the tasks 202 but may only provide the selected incentive for the corresponding task 202. In some aspects, incentive application 138 may make the selected minimal incentive available for each of the tasks 202 in the task list 200. For example, if the selected minimal incentive is a 10% discount for task 1, incentive application 138 may provide the user with all of the tasks, e.g., tasks 1-5, having a 10% discount in an effort to entice the user to re-route to any of the tasks. This minimal incentive may be presented for a task, e.g., task 4, even though the calculated incentive for task 4 may be a larger incentive, e.g., a 25% discount. In some aspects, the incentive may be presented to the user along with a new route suggestion including the retail or service facility as a new destination. In some aspects, the new route suggestion may also include one or more of a current location 126, destination location 128, new route 132, expected arrival time 134, and incident data 136 for the new route, e.g., as received from navigation application server 150.

At 330, incentive application 138 may receive an input from the user indicating either an acceptance or selection of the incentive, task, or new route suggestion by the user or a rejection of the incentive, task, or new route suggestion, e.g., via input device 120. If the input indicates an acceptance, the method proceeds to step 332. If the input indicates a rejection, the method returns to 322 and a new incentive is selected.

At 332, incentive application 138 may transmit the acceptance to navigation application 124 or otherwise cause navigation application 124 to re-route to the new destination where the incentivized task is to be performed.

Figure 4:
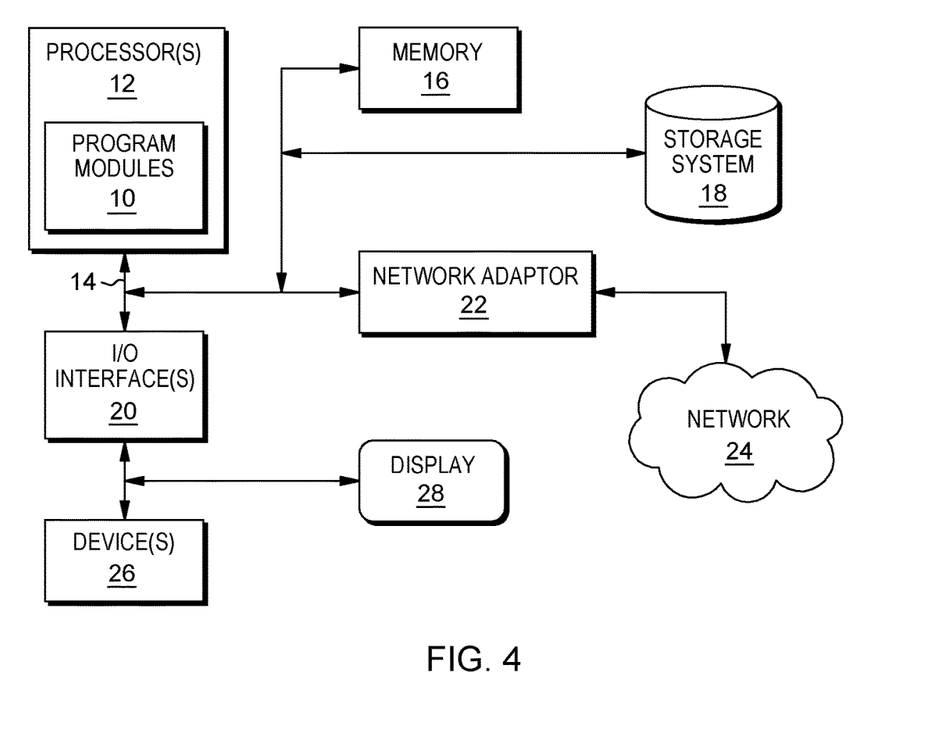
FIG. 4 is an exemplary block diagram of a computer system in which processes involved in the system, method, and computer program product described herein may be implemented.

FIG. 4 illustrates a schematic of an example computer or processing system that may implement any portion of system 100, computing device 110, navigation application server 150, incentive server 180, manager device 195, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available system readable media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:

receiving a current location, a navigation route, and an expected delay due to an incident on the navigation route from a navigation application of a computing device;

receiving, via an input device of the computing device, a list of one or more tasks from a user, each task in the list comprising an associated task value and an expected task duration;

computing, by the computing device, an incentive for each task in the list based on the received expected delay, task value, and expected task duration, and calculating a probability the user will re-route to stop at a facility for fulfilling the task based on each incentive, said probability calculating implementing an adaptive shortest path method based on a road network having stochastic weights corresponding to road travel-times;

comparing the incentive and probability calculated for each task to determine which task has an incentive having an associated cost below a threshold and a probability that the user will re-route to stop at the facility that is greater than a probability that the user will not re-route to the facility; and presenting the incentive having an associated cost below a threshold to the user via a display of the computing device.

2. The method of claim 1, wherein computing the incentive for each task comprises computing max (max(expected task duration, expected delay)−expected delay−task value, 0).

3. The method of claim 1, further comprising:
transmitting the incentive having an associated cost below a threshold to a manager device associated with the facility; and
receiving acceptance of the minimal incentive from the manager device,
wherein presenting the minimal incentive to the user via a display of the computing device is performed in response to receiving acceptance of the incentive having an associated cost below a threshold from the manager device.

4. The method of claim 1, further comprising:
receiving, via the input device, an acceptance of the incentive having an associated cost below a threshold from the user; and
in response to receiving acceptance of the incentive having an associated cost below a threshold from the user, transmitting a command to the navigation application to re-route the user to the facility.

5. The method of claim 1, further comprising receiving an expected arrival time from the navigation application, the expected arrival time determined based on the current location, a destination location of the navigation route and incident data received from a navigation server by the navigation application, the expected arrival time indicating a time at which the user is predicted to arrive at the destination location should the user continue along the route instead of re-routing to the facility.

6. The method of claim 5, further comprising determining a second expected arrival time, the second arrival time indicating a time at which the user is predicted to arrive at the destination location should the user re-route to the facility in response to receiving the incentive having an associated cost below a threshold, the second expected arrival time based on the expected task duration, navigation route, and the incident data, wherein presenting the incentive having an associated cost below a threshold comprises presenting the determined second expected arrival time.

7. The method of claim 6, further comprising comparing the expected arrival time and the second expected arrival time, wherein presenting the incentive having an associated cost below a threshold comprises presenting a difference between the expected arrival time and the second expected arrival time to the user.

8. A non-transitory computer readable medium comprising instructions that, when executed by at least one processor comprising hardware, configure the at least one hardware processor to:
receive a current location, a navigation route, and an expected delay due to an incident on the navigation route from a navigation application of a computing device;
receive, via an input device of the computing device, a list of one or more tasks from a user, each task in the list comprising an associated task value and expected task duration;
compute, by the computing device, an incentive for each task in the list based on the received expected delay, task value, and expected task duration, and
calculate a probability the user will re-route to stop at a facility for fulfilling the task based on each incentive, said probability calculating implementing an adaptive shortest path method based on a road network having stochastic weights corresponding to road travel-times;
compare the incentive and probability calculated for each task to determine which task has an incentive having an associated cost below a threshold and a probability that the user will re-route to the facility that is greater than a probability that the user will not re-route to the facility; and
present the incentive having an associated cost below a threshold to the user via a display of the computing device.

9. The non-transitory computer readable medium of claim 8, wherein computing the incentive for each task comprises computing max (max(expected task duration, expected delay)−expected delay−task value, 0).

10. The non-transitory computer readable medium of claim 8, the instructions further configuring the at least one processor to:
transmit the incentive having an associated cost below a threshold to a manager device associated with the facility; and
receive acceptance of the incentive having an associated cost below a threshold from the manager device,
wherein presenting the incentive having an associated cost below a threshold to the user via a display of the computing device is performed in response to receiving acceptance of the incentive having an associated cost below a threshold from the manager device.

11. The non-transitory computer readable medium of claim 8, the instructions further configuring the at least one processor to:
receive, via the input device, an acceptance of the incentive having an associated cost below a threshold from the use; and
in response to receiving acceptance of the incentive having an associated cost below a threshold from the user, transmit a command to the navigation application to re-route the user to the facility.

12. The non-transitory computer readable medium of claim 8, the instructions further configuring the at least one processor to receive an expected arrival time from the navigation application, the expected arrival time determined based on the current location, a destination location of the navigation route and incident data received from a navigation server by the navigation application, the expected arrival time indicating a time at which the user is predicted to arrive at the destination location should the user continue along the route instead of re-routing to the facility.

13. The non-transitory computer readable medium of claim 12, the instructions further configuring the at least one processor to determine a second expected arrival time, the second arrival time indicating a time at which the user is predicted to arrive at the destination location should the user re-route to the facility in response to receiving the incentive having an associated cost below a threshold, the second expected arrival time based on the expected task duration, navigation route, and the incident data, wherein presenting the incentive cost below a threshold comprises presenting the determined second expected arrival time.

14. The non-transitory computer readable medium of claim 13, the instructions further configuring the at least one processor to compare the expected arrival time and the second expected arrival time, wherein presenting the incentive having an associated cost below a threshold comprises presenting a difference between the expected arrival time and the second expected arrival time to the user.

15. A system comprising at least one processor comprising hardware, the at least one processor configured to:
- receive a current location, a navigation route, and an expected delay due to an incident on the navigation route from a navigation application of a computing device;
- receive, via an input device of the computing device, a list of one or more tasks from a user, each task in the list comprising an associated task value and expected task duration;
- compute, by the computing device, an incentive for each task in the list based on the received expected delay, task value, and expected task duration, and calculate a probability the user will re-route to stop at a facility for fulfilling the task based on each incentive, said probability calculating implementing an adaptive shortest path method based on a road network having stochastic weights corresponding to road travel-times;
- compare the incentive and probability calculated for each task to determine which task has an incentive below an associated cost threshold and a probability that the user will re-route to the facility that is greater than a probability that the user will not re-route to the facility; and
- present the incentive below an associated cost threshold to the user via a display of the computing device.

16. The system of claim 15, wherein computing the incentive for each task comprises computing max (max (expected task duration, expected delay)–expected delay–task value, 0).

17. The system of claim 15, the at least one processor further configured to:
- transmit the incentive having an associated cost below a threshold to a manager device associated with the facility; and
- receive acceptance of the incentive having an associated cost below a threshold from the manager device, wherein presenting the incentive having an associated cost below a threshold to the user via a display of the computing device is performed in response to receiving acceptance of the incentive from the manager device.

18. The system of claim 15, the at least one processor further configured to:
- receive, via the input device, an acceptance of the incentive having an associated cost below a threshold from the user; and
- in response to receiving acceptance of the incentive having an associated cost below a threshold from the user, transmit a command to the navigation application to re-route the user to the facility.

19. The system of claim 15, the at least one processor further configured to:
- receiving an expected arrival time from the navigation application, the expected arrival time determined based on the current location, a destination location of the navigation route and incident data received from a navigation server by the navigation application, the expected arrival time indicating a time at which the user is predicted to arrive at the destination location should the user continue along the route instead of re-routing to the facility; and
- determining a second expected arrival time, the second arrival time indicating a time at which the user is predicted to arrive at the destination location should the user re-route to the facility in response to receiving the incentive having an associated cost below a threshold, the second expected arrival time based on the expected task duration, navigation route, and the incident data, wherein presenting the incentive having an associated cost below a threshold comprises presenting the determined second expected arrival time.

20. The system of claim 19, the at least one processor further configured to compare the expected arrival time and the second expected arrival time, wherein presenting the incentive having an associated cost below a threshold comprises presenting a difference between the expected arrival time and the second expected arrival time to the user.

* * * * *